J. J. LUDWICK.
COTTON CHOPPER.
APPLICATION FILED OCT. 27, 1909.

952,826.

Patented Mar. 22, 1910.
2 SHEETS—SHEET 1.

Witnesses
Inventor
John J. Ludwick
Attorney

J. J. LUDWICK.
COTTON CHOPPER.
APPLICATION FILED OCT. 27, 1909.
952,826.
Patented Mar. 22, 1910.
2 SHEETS—SHEET 2.
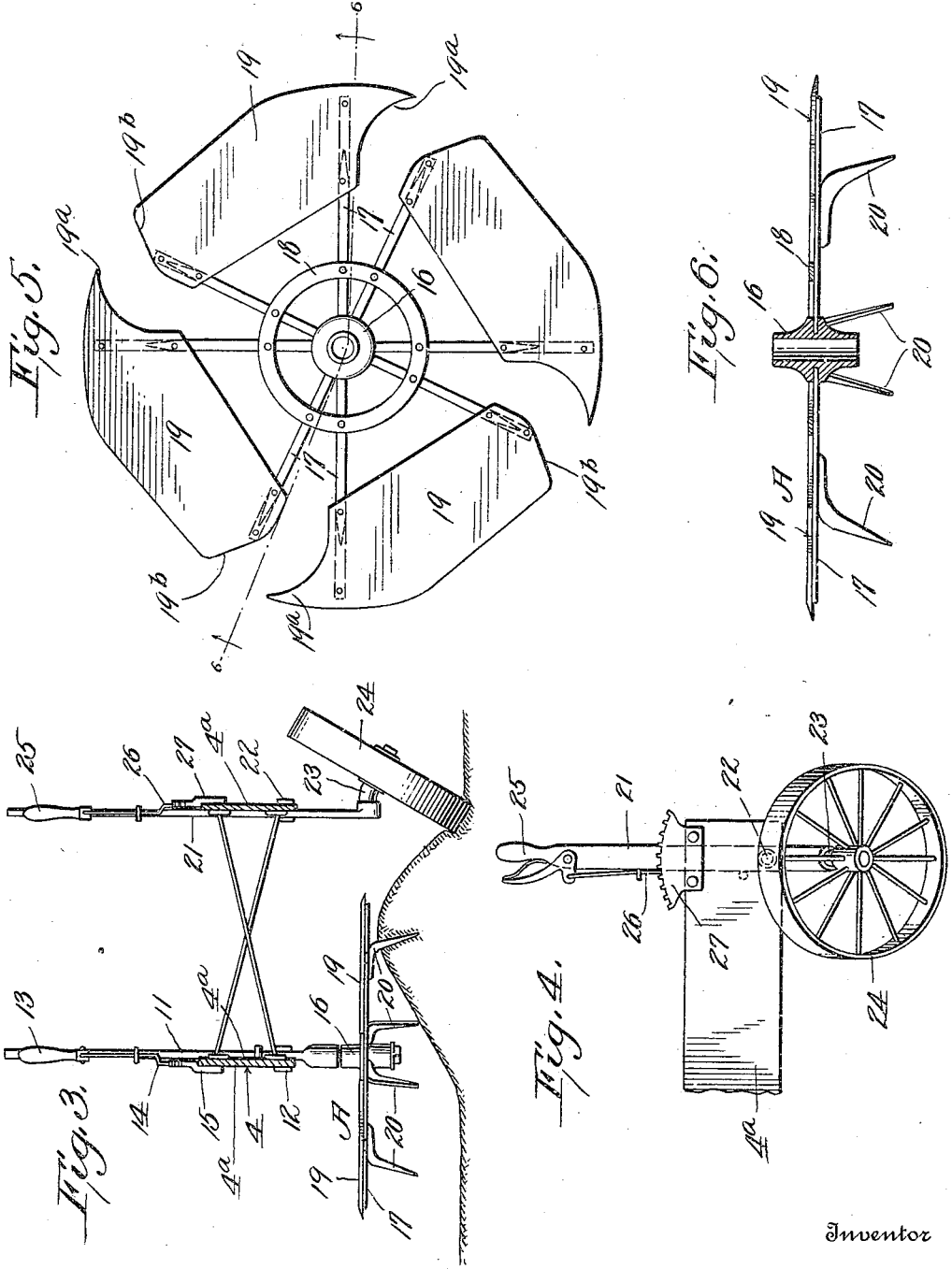
Witnesses
Oliver W. Holmes
Isabel Burch
Inventor
John J. Ludwick,
By H. S. Hill
Attorney

UNITED STATES PATENT OFFICE.

JOHN JAY LUDWICK, OF MEMPHIS, TENNESSEE.

COTTON-CHOPPER.

952,826.  Specification of Letters Patent.  Patented Mar. 22, 1910.

Application filed October 27, 1909. Serial No. 524,895.

*To all whom it may concern:*

Be it known that I, JOHN JAY LUDWICK, a citizen of the United States, residing at Memphis, in the county of Shelby and State of Tennessee, have invented certain new and useful Improvements in Cotton-Choppers, of which the following is a specification.

The present invention relates in general to agricultural implements, and more particularly to an improved cotton chopper embodying a novel construction whereby the young plants may be uniformly and effectively thinned without danger of injuring those plants left standing.

The invention further contemplates a cotton chopper which is comparatively simple and inexpensive in its construction, which will operate in an effective manner to accomplish the desired result, and which can be readily adjusted to accommodate itself to the varying conditions under which it may be found desirable to use the machine.

With these and other objects in view, the invention consists in certain arrangements and combinations of the parts as will more fully appear as the description proceeds, the novel features being pointed out in the appended claims.

Figure 1:
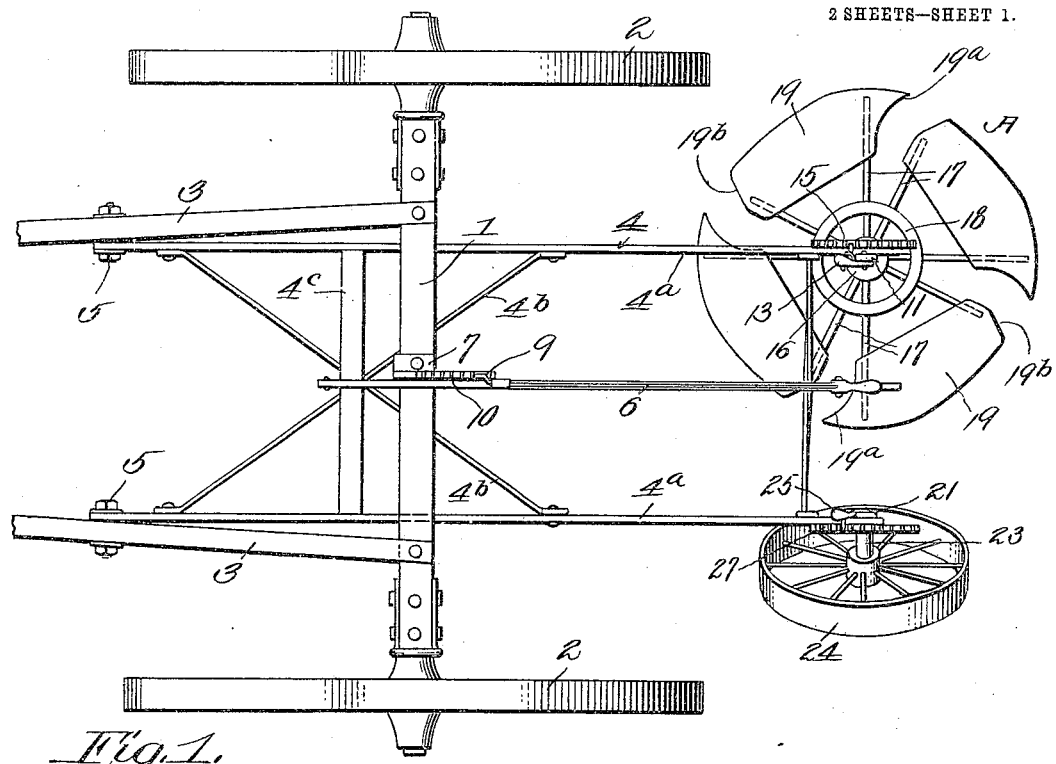
Figure 2:
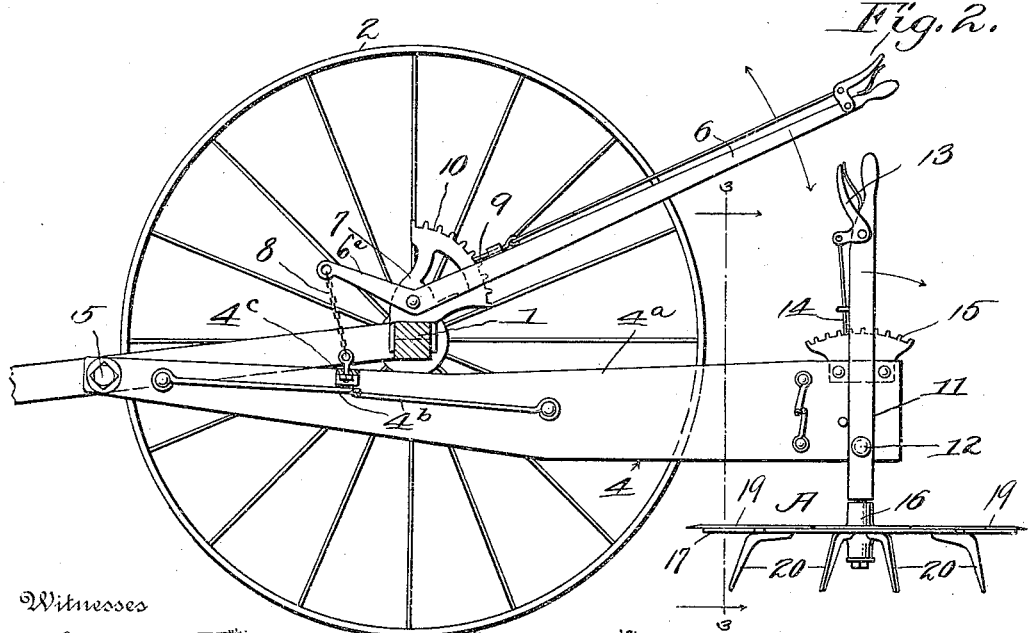

For a full understanding of the invention, reference is to be had to the accompanying drawings, in which:

Figure 1 is a top plan view of a cotton chopper constructed in accordance with the invention; Fig. 2 is a vertical longitudinal sectional view through the same; Fig. 3 is a transverse sectional view on the line 3—3 of Fig. 2; Fig. 4 is a detail view of the inclined wheel and adjacent parts; Fig. 5 is an enlarged plan view of the chopping wheel; and, Fig. 6 is a transverse sectional view through the chopping wheel on the line 6—6 of Fig. 5.

Corresponding and like parts are referred to in the following description and indicated in all the views of the drawings by the same reference characters.

Specifically describing the embodiment of the invention illustrated on the accompanying drawings, the numeral 1 designates the main axle which extends transversely across the machine and is provided at its ends with the usual supporting wheels 2. Projecting forwardly from the axle 1 and rigidly connected thereto are the tongues 3 to which the draft connections may be made in any desired manner. Passing under the axle 1 is a swinging frame 4 the forward end of which is pivoted upon the tongues 3 as indicated at 5 so that the rear end of the frame can be raised and lowered as desired. This frame 4 may be constructed in any suitable manner, and in the present instance is shown as formed of the two longitudinal beams 4ª connected by the bracing 4ᵇ and cross piece 4ᶜ. For the purpose of manipulating this swinging frame 4 and holding the same in an adjusted position, a lever 6 is utilized, the said lever being pivoted upon a casting 7 applied to the axle and being formed with an arm 6ª which is connected by a link 8 to the cross piece 4ᶜ of the swinging frame. The usual dog 9 is provided upon the lever 6 for engagement with a rack 10 to lock the lever against movement. A vertical standard 11 is pivoted at an intermediate point, as indicated at 12, to the rear end of one of the longitudinal beams 4ª of the swinging frame 4, and terminates at its lower end in a spindle upon which the chopping wheel A is journaled so as to revolve in a substantially horizontal plane. The upper end of this vertical standard 11 extends above the swinging frame 4 where it terminates in a handle 13 and is provided with the usual form of dog 14 for engagement with the rack 15 to lock the standard against pivotal movement.

Specifically describing the chopping wheel A, it will be observed that the same comprises a hub 16 from which a series of arms 17 radiate, the said arms being braced and reinforced toward their inner ends by means of the ring 18 and being arranged in pairs which are connected at their outer ends by means of the chopping knives or plates 19. In the preferred form of the invention these plates 19 are pointed at one end as indicated at 19ª and rounded at the opposite end as indicated at 19ᵇ, the said pointed ends being designed to enter the row of young plants while the rounded ends which are the last to leave the row of young plants admit of the blade withdrawing without disturbing the cotton or young plants to be saved. The point 19ª cuts out at the point in passing into the row of young plants so as to allow the arched space in the blade to readily withdraw from the said row of young plants as the wheel passes forward. For the purpose of rotating the chopping wheel the various arms 17 thereof are provided at intermediate points in their lengths with downwardly projecting prongs 20 which engage the side of the row or hill and rotate the chopping wheel as the machine is advanced.

A second vertical standard 21 is pivoted at 22 to the rear end of the other longitudinal beam 4ª and is provided at its lower end with a laterally projecting spindle 23 upon which an inclined wheel 24 is journaled. In a manner similar to the previously described standard 11 this standard 21 extends upwardly above the swinging frame 4 where it terminates in a handle 25 and is provided with the usual dog 26 designed to coöperate with the rack 27 to normally hold the standard against swinging movement. It will be obvious, however, that by swinging these standards about their respective pivot points the chopping wheel A and the inclined wheel 24 can be set at any desired angle, and that by suitably manipulating the main lever 6 the chopping mechanism can be raised and lowered vertically.

In the operation of the device, the machine is designed to straddle a row of cotton or other young plants so that the inclined wheel 24 will travel along one side of the row or hill while the prongs 20 of the chopping wheel A will engage the opposite side of the row or hill. These prongs 20 thereby cause the chopping wheel to rotate as the machine is advanced so that the blades 19 will thin out the cotton, the cotton which remains standing being absolutely uninjured. The inclined wheel 24 traveling upon the opposite side of the row or hill to the chopping wheel serves to hold the latter in proper position so that the prongs 20 will always engage the earth and turn the wheel in the required manner.

Having thus described the invention what I claim as new and desire to secure by Letters Patent is:

1. In a cotton chopper, the combination of a frame, a chopping wheel carried by the frame, means carried by the chopping wheel for engaging one side of the row to rotate the wheel as the machine is advanced, and means engaging the opposite side of the row for holding the chopping wheel in operative position.

2. In a cotton chopper, the combination of a frame, a chopping wheel carried by the frame, means carried by the chopping wheel for engaging one side of the row to rotate the wheel as the machine is advanced, and a wheel carried by the frame and traveling upon the opposite side of the row to retain the chopping wheel in an operative position with respect to the row.

3. In a cotton chopper, the combination of a frame, a chopping wheel carried by the frame, means carried by the chopping wheel for engaging one side of the row to rotate the wheel as the machine is advanced, and an inclined wheel mounted upon the frame and traveling upon the opposite side of the row to retain the chopping wheel in operative position with respect to the row.

4. In a cotton chopper, the combination of a frame, a chopping wheel carried by the frame, prongs projecting from the chopping wheel for engaging one side of the row to rotate the wheel as the machine is advanced, and a wheel carried by the frame and traveling upon the opposite side of the row to retain the chopping wheel in operative position with respect to the row.

5. In a cotton chopper, the combination of a frame, a vertical standard pivoted upon the frame, a horizontally disposed chopping wheel journaled upon the standard, prongs projecting from the chopping wheel for engaging the row to rotate the wheel as the machine is advanced, a second vertical standard pivoted upon the frame, and a wheel carried by the frame and coöperating with the row to hold the chopping wheel in operative position with respect thereto.

6. In a cotton chopper, the combination of a traveling support, a swinging frame mounted upon the traveling support, a chopping wheel carried by the swinging frame, prongs projecting from the chopping wheel for engaging the row to rotate the wheel as the machine is advanced, and a wheel also carried by the swinging frame and coöperating with the row to hold the chopping wheel in operative position with respect thereto.

7. In a cotton chopper, the combination of a traveling support, a swinging frame mounted upon the traveling support, means for holding the swinging frame in an adjusted position, a vertical standard pivoted upon the swinging frame, a horizontally disposed chopping wheel journaled upon the lower end of the vertical standard, prongs projecting from the chopping wheel for engaging a side of the row to rotate the wheel, a second vertical standard pivotally mounted upon the swinging frame, and an inclined wheel carried by the second vertical standard and traveling along one side of the row for holding the chopping wheel in operative position with respect thereto.

In testimony whereof I affix my signature in presence of two witnesses.

JOHN JAY LUDWICK.

Witnesses:
LETITIA I. FOSTER,
J. C. McDAVITT.